Nov. 28, 1944.   S. B. MARTIN   2,363,890
PUSHER
Filed Oct. 10, 1942   3 Sheets-Sheet 1
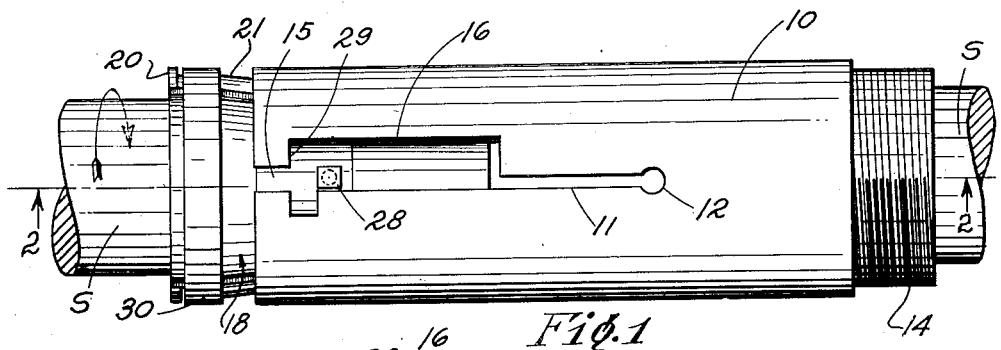
*Fig. 1*
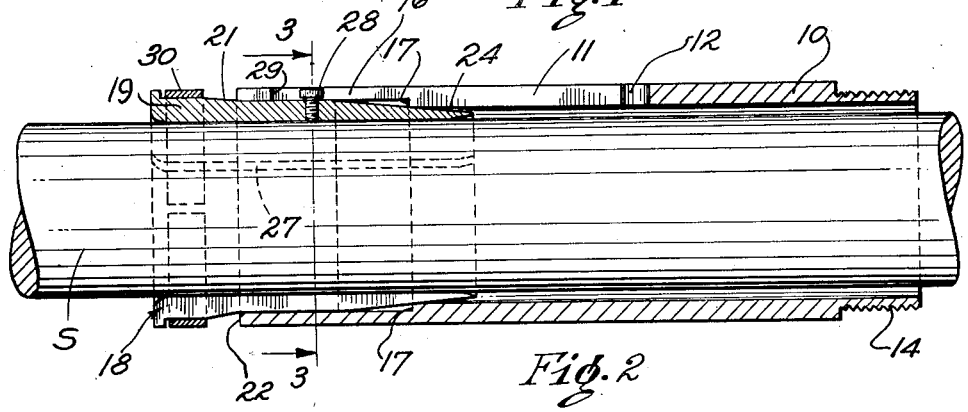
*Fig. 2*
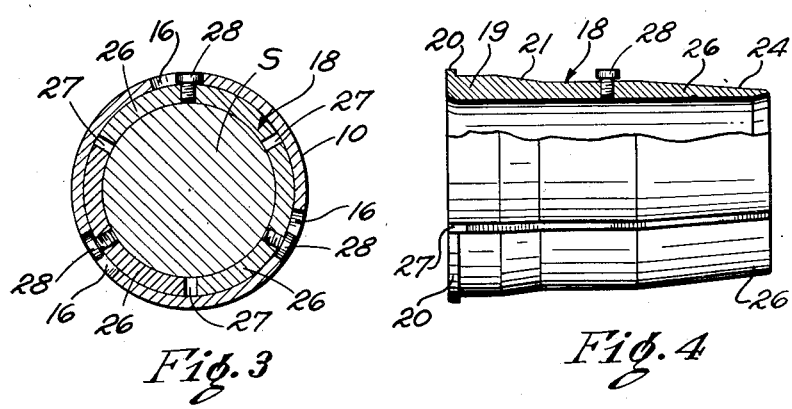
*Fig. 3*   *Fig. 4*
INVENTOR.
STODDARD B. MARTIN
BY Rickey & Watts
ATTORNEYS Nov. 28, 1944.   S. B. MARTIN   2,363,890
PUSHER
Filed Oct. 10, 1942   3 Sheets-Sheet 2
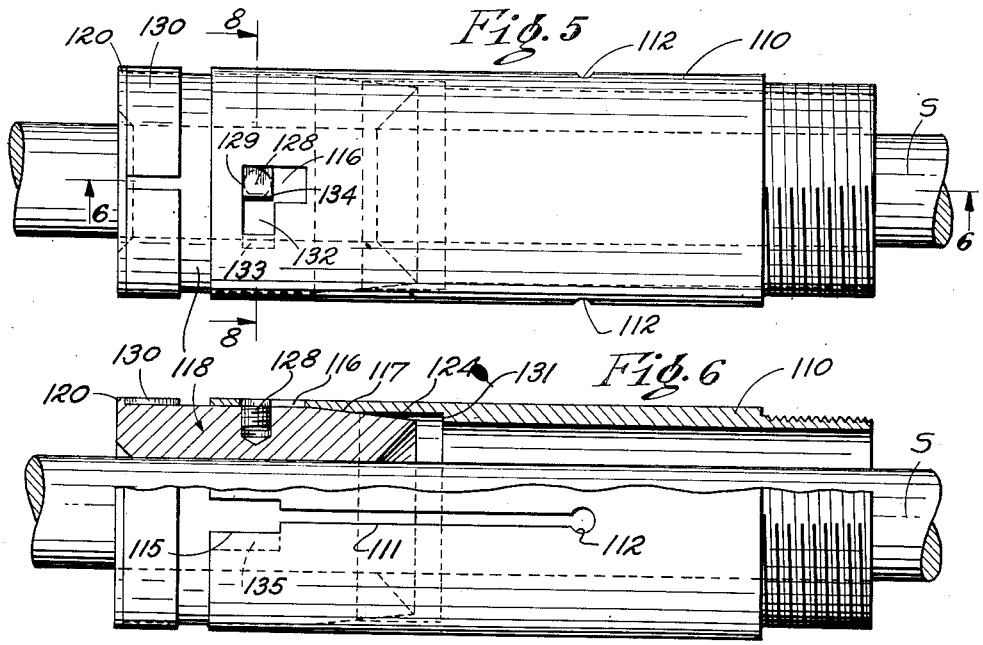
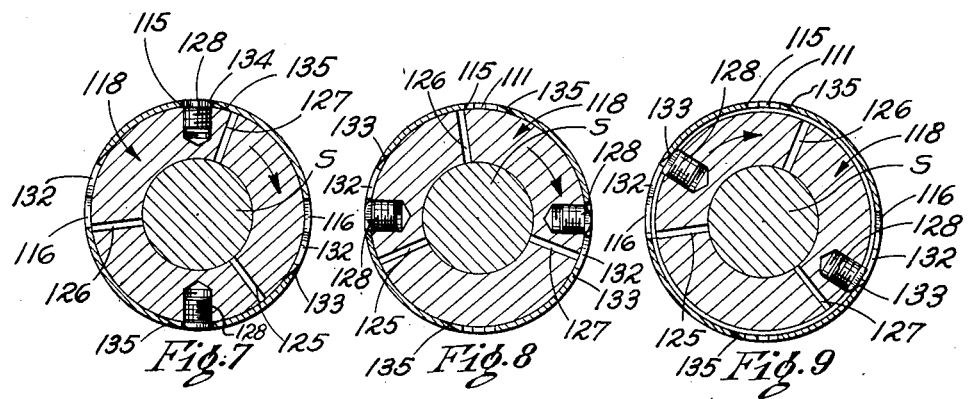
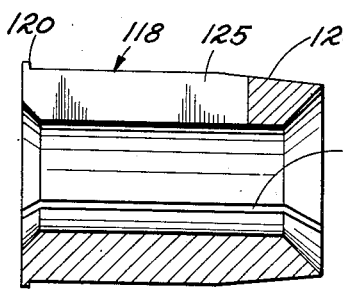
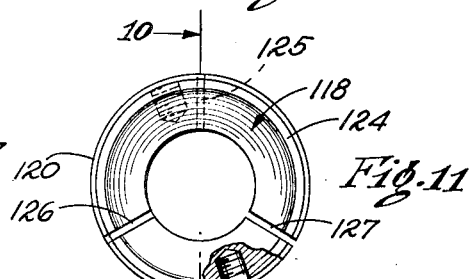
INVENTOR.
STODDARD B. MARTIN
BY Richey & Watts
ATTORNEYS Nov. 28, 1944. S. B. MARTIN 2,363,890
PUSHER
Filed Oct. 10, 1942 3 Sheets-Sheet 3
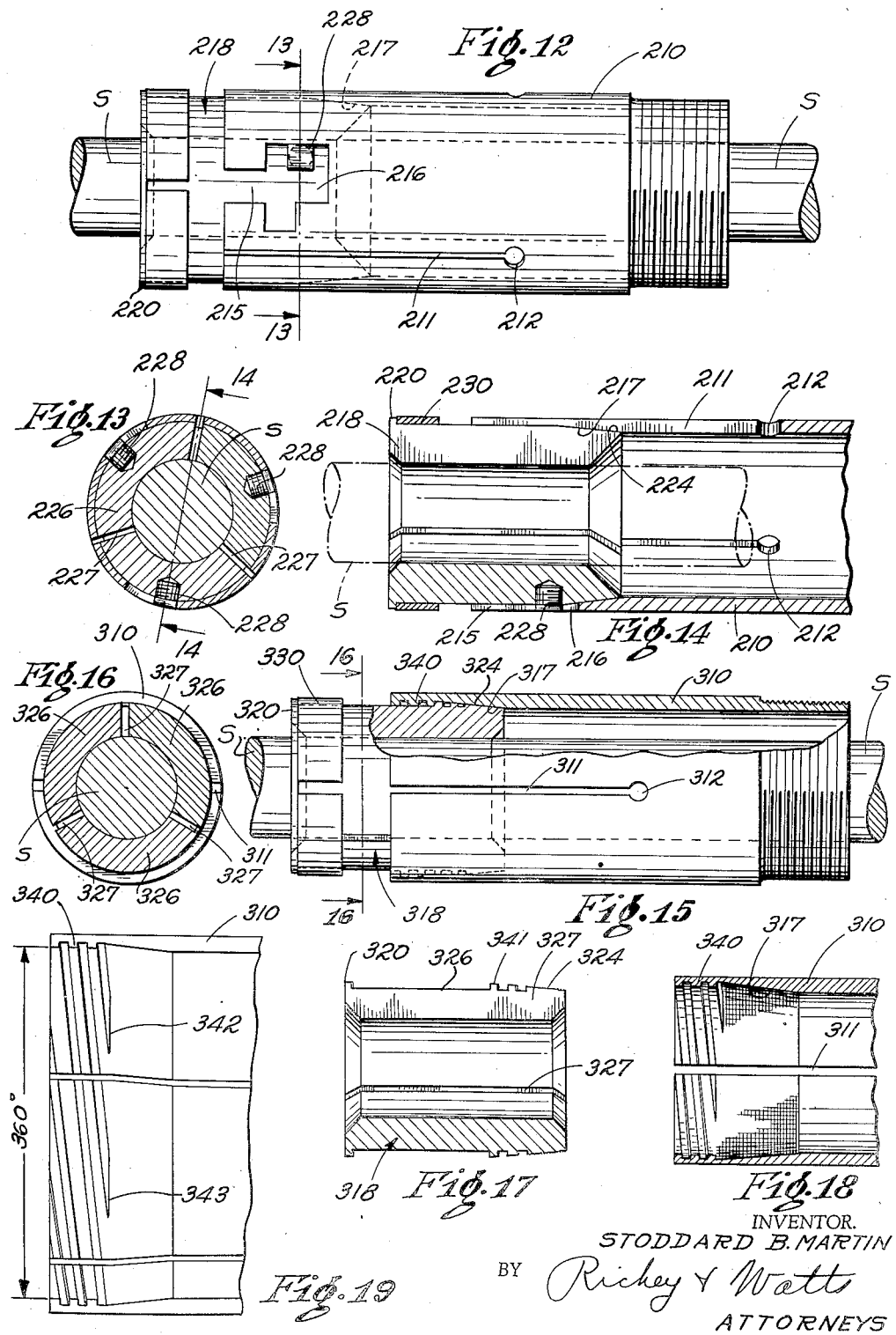
INVENTOR.
STODDARD B. MARTIN
BY Richey & Watt
ATTORNEYS Patented Nov. 28, 1944.

2,363,890

UNITED STATES PATENT OFFICE 2,363,890

PUSHER

Stoddard B. Martin, Lakewood, Ohio

Application October 10, 1942, Serial No. 461,559

18 Claims. (Cl. 29—62)

This invention relates to improvements in stock feed fingers or pushers of the type employed in automatic screw machines.

Each spindle of an automatic screw machine ordinarily surrounds a rotating collet tube having a collet at its forward end which is arranged to be compressed radially to grip and rotate a bar of stock fed axially through the tube. At the end of each cycle of operation the projecting end of stock is cut off from the bar, whereupon the collet opens and a new length of stock is fed forwardly and the collet is again closed to grip the stock and repeat the cycle of operation. The stock is ordinarily fed forward by a pusher carried by a reciprocating pusher tube arranged between and coaxial with the collet tube and the bar of stock.

In the conventional machine the pusher is simply a spring bushing exerting a constant grip on the bar of stock which is moved forwardly after the collet opens until the forward end of the bar strikes a stock gauge. The collet then grips the bar and the pusher is retracted. One of the disadvantages of this arrangement is that when the pusher is given a sufficiently tight grip on the bar to insure accurate feeding and prevent rebounding when the bar strikes the gauge, there is danger of scratching or scoring the stock when the pusher is retracted. Another disadvantage of such an arrangement is that the pusher exerts a constant grip on the bar stock during both the feeding and return strokes so that the gripping surfaces of the pusher are rapidly worn out by the friction of the return strokes.

The principal objects of this invention are to combine in a pusher a one-way gripping mechanism, removable pads for gripping various sizes of stock up to and including the maximum capacity of the machine, and means for releasing the gripping action when it is desired to withdraw the stock; to dispose the one-way gripping mechanism and all necessary abutments between the shell and pads within the thickness of the wall of the shell; to eliminate all loose or readily separable parts except the removable pads or bushing; and to simplify and reduce the cost of pushers of this type. Other objects and advantages will appear in the following detailed description of preferred embodiments of this invention.

The present invention is an improvement on the subject-matter disclosed in my co-pending application, Serial No. 446,754, filed June 12, 1942.

In the accompanying drawings:

Fig. 1 is a side elevation of a complete pusher embodying the present invention;

Fig. 2 is a longitudinal section of the improved pusher, the view being taken on a plane indicated by line 2—2 of Fig. 1;

Fig. 3 is a cross section of the shell and bushing taken on a plane indicated by the line 3—3 of Fig. 2;

Fig. 4 is an elevaional view of the bushing with a portion shown in section in the interest of clarity;

Fig. 5 is a side elevation of a slightly modified form of pusher;

Fig. 6 is a different elevation of the pusher shown in Fig. 5, partly sectioned on the line 6—6 of Fig. 5;

Fig. 7 is a section taken on the plane indicated by the line 8—8 of Fig. 5, but with the bushing turned 90° from its position in Fig. 5;

Fig. 8 is a section on the line 8—8 of Fig. 5;

Fig. 9 is a section corresponding to Figs. 7 and 8, but with the bushing turned slightly from the position shown in Fig. 8;

Fig. 10 is a longitudinal section through the bushing shown in Figs. 5 to 9;

Fig. 11 is an end view of the front of the pusher shown in Fig. 5 with the stock removed;

Fig. 12 is an elevation of a further modified form of the pusher;

Fig. 13 is a cross section taken on the line 13—13 of Fig. 12;

Fig. 14 is a longitudinal section taken on the line 14—14 of Fig. 13;

Fig. 15 is an elevation, partly sectioned, of another modified form of the pusher;

Fig. 16 is a section taken on the line 16—16 of Fig. 15;

Fig. 17 is a longitudinal section through the bushing shown in Figs. 15 and 16;

Fig. 18 is a longitudinal section through the shell shown in Figs. 15 and 16, with the bushing removed; and Fig. 19 is a developed view of the inner surface of the shell shown in Figs. 15 and 16.

Referring to the drawings, the pusher of the present invention embodies generally a pusher shell or the like in which may be secured a bushing of any desired size of internal opening and arranged to resiliently grip the bar of stock.

As shown in Figs. 1 and 2, the improved pusher includes a shell 10 formed with longitudinal slots 11 extending inwardly from the forward end of the shell and terminating in apertures 12. The shell 10 may be formed integrally with a pusher tube, not shown, or the inner end 14 of the shell may be threaded for engagement with the pusher tube. The shell 10 is preferably slotted and the segments so formed are bent inwardly prior to the hardening thereof so that the shell will exert a spring pressure upon a bushing engaging the stock.

The outer end of the slots 11 are widened to define keyways 15 which terminate in L-shaped cutouts or guideways 16 for the reception of suitable locking keys or studs. The forward end of the shell 10 is counterbored to define a shoulder 17 disposed intermediate the ends of the shell, which engages the rear end of a bushing to aid in the wedging of the bushing upon a piece of bar stock.

A bushing 18, Fig. 4, is positioned within the forward end of the shell 10 and is provided with an enlarged or thickened forward end portion 19, terminating in the flange 20. The end portion 19 of the bushing is formed with an inwardly tapered surface 21 which engages the forward end surface 22 of the shell 10. The center portion of the bushing 18 is formed with an external diameter slightly less than the internal diameter of the counterbored portion of the shell. The rear end of the bushing 18 is provided with an inwardly tapered surface 24 which engages the shoulder 17 formed in the shell. Upon the positioning of the bushing 18 in the shell 10 the rear tapered surface 24 of the bushing is readily inserted within the counterbored portion of the shell to initially expand the spring segments of the shell whereby the center portion of the bushing may then be forced into the shell.

The bushing 18 is divided into three segmental portions 26 by longitudinal cuts or slots 27. A stud or locking key 28 is threaded into, or otherwise secured to, each of the segmental portions 26 intermediate the ends of the bushing. The studs 28 project from the bushing 18 a distance substantially equal to the thickness of the shell 10 and are arranged to extend through the cutouts or guideways 16 of the shell upon the insertion of the bushing therein. Each of the portions of the cutouts or guideways 16 having the greater axial length is provided with an abutment surface 29 engageable with the studs 28 for retracting the bushing 18 upon the rearward movement of the shell 10.

A spring collar or band 30 encircles the enlarged end portion 19 of the bushing for initially urging the segmental portions 26 of the bushing into engagement with the bar stock S. The spring is held from slipping off the bushing by the flange 20.

Although the longitudinal slots 11 in the shell 10 preferably extend into the cutouts or guideways 16 for the reception of the studs 28, as illustrated, it will be understood that it is not necessary for the slots 11 to intersect the keyways 15 and cutouts 16. The slots 11 render the shell resilient and the keyways 15 and cutouts 16 cooperate with the studs 28 on the bushing. Combining them, as illustrated, reduces the number of cuts that must be made through the front edge of the shell, but in this form of the invention there is no critical relation between the positions of the slots and keyways.

In the assembly and use of the improved pusher, the rear end of the bushing 18, being of a smaller diameter than the contracted segments of the shell 10, is inserted within the shell and the tapered rear surface 24 tends to expand the shell segments to facilitate the positioning of the bushing in the shell. As the bushing 18 is inserted within the shell the studs 28 move through the keyways 15 into the portions of the cutouts 16 having the greater axial length, as illustrated in Fig. 1. The spring tension of the shell segments, bushing, and spring 30 combine to give the bushing a secure grip upon the stock S.

Upon the initial forward movement of the pusher tube, which carries the shell 10, the tapered surface 21 at the forward end of the bushing cooperates with the surface 22 at the outer end of the shell 10 so that the segments of the shell wedge the forward end of the bushing inwardly to securely grip the stock S. Subsequent the initial wedging action of the forward end of the bushing 18, by the shell 10, the shoulder 17 in the shell engages the rear tapered surface 24 of the bushing so that upon the continued forward movement of the shell the shoulder 17 urges the rear surface 24 of the bushing into tight engagement with the stock S. During the wedging of the bushing 18 upon the stock S by the forward movement of the shell 10, the studs 28 are disposed within the portions of the cutouts 16 having the greater axial length.

In normal operation the stock S is rotated in a clockwise direction, as viewed from the rear end of the shell 10, which movement is transmitted to the bushing 18 and shell 10 through the wedging of the bushing upon the stock. The studs 28 are adapted to move within the portions of the cutouts 16 having the greater axial length, and engage the shell 10 to insure its rotation with respect to the bushing and stock S.

Upon the rearward movement or return stroke of the pusher tube the shell is retracted, causing the wedging grip of the shoulder 17 and surface 22 to be released from the tapered surfaces 21 and 24 of the bushing 18. As the shell 10 is retracted the abutting surfaces 29, defined by the cutouts 16, engage the studs 28, thus transmitting the rearward movement of the shell and pusher tube to the bushing. The bushing at this stage of the operation has only a light grip on the stock S, resulting from the spring collar 30, and is readily moved over the stock without scratching or scoring the same. Thus the pusher normally exerts a positive grip on the stock during the feeding or forward stroke which is reduced to such a degree on the retracting stroke as to avoid scoring or marring of the bar of stock and excessive wear on the engaging surfaces of the bushing.

When it is desired to withdraw the bar of stock from the pusher, the collet of the machine is closed upon the stock and a suitable tool, such as a wrench, is applied to the pusher tube, at the rear end of the machine, for rotating the shell in a clockwise direction. The turning of the shell 10 causes the studs 28 to be moved into the portions of the cutout 16 having the shorter axial length. In this position, the studs 28 prevent relative axial movement of the shell and bushing and the consequent engagement of the tapered and beveled surfaces. If the studs 28 are not disposed in alignment with the portions of the cutouts 16 having the shorter axial length it is only necessary to slide the shell 10 axially a sufficient distance to align the studs 28 with the portions of the cutout prior to rotating the shell.

In pushers for the smaller sizes of machines, the spring tension exerted by the shell on the bushing is relatively light, and the stock may be withdrawn from the pusher by grasping the stock and rotating the same in a counter-clockwise direction. The bushing 18 is retained in engagement with the stock S through the pressure of the spring collar 30 so that the turning of the stock is transmitted to the bushing to move the studs 28 into the portion of the cutouts having the shorter axial length.

When the bar is removed from the pusher the bushing 18 collapses inwardly the distance between the segmental portions 26 formed by the slots 27. As the bushing collapses the segmental portions of the shell 10 formed by the slots 11 are likewise collapsed, thus retaining the studs in the cutouts 16 and insuring the retension of the bushing within the shell.

In the form of the invention shown in Figs. 5 to 11, the shell 110 is provided with two oppositely disposed slots 111 extending rearwardly from the forward edge and terminating in holes 112, and two L-shaped cutouts 116 arranged opposite each other and spaced circumferentially from the slots 111. The slots 111 are widened adjacent the front end of the shell, forming keyways 115. The shell is counterbored from its front end a short distance to a wedging surface 117. If desired, a smaller counterbore may be continued from the wedging surface 117 to a shoulder 131, arranged to positively limit relative axial movement of the shell and bushing.

A one-piece bushing 118 is arranged to fit within the shell 110. At its forward end the bushing has a spring retaining flange 120, and at its rearward end is tapered to form a wedging surface 124 arranged to cooperate with the wedging surface 117 on the shell.

The bushing is rendered resilient by three slots 125, 126, and 127. The slot 125 extends into the bushing from its front end but stops short of the rear end so as not to sever the bushing. Similarly, the slot 126 extends into the bushing from its rear end but stops short of the front end. The slot 127 extends through the bushing from end to end. Before hardening, the bushing is given an inward set, tending to collapse the front end of the slot 125, the rear end of the slot 126, and the entire length of the slot 127. Thus when finished and hardened the bushing may be forced open to receive the stock and exert a spring grip upon the stock.

The bushing is also provided with a pair of oppositely disposed studs 128 secured in place in any desired manner, as by threaded shanks screwed into tapped holes in the bushing, as illustrated. Preferably the studs are square in outline, and after being screwed into position are welded in place with two sides parallel with the axis of the bushing.

Each of the cutouts 116 has a rearwardly facing edge 129 adapted to engage the forward edge of one of the studs 128 to pull the bushing rearwardly on the retracting stroke of the pusher tube. Each cutout 116 has a portion which is longer axially than the studs 128, in which one of the studs may work to permit relative axial movement of the shell and bushing, and a shorter portion, or notch, 132 adapted to receive a stud 128 and limit relative axial movement of the shell and bushing.

The longitudinal edge of each notch 132 is beveled as indicated at 133, and the cooperating longitudinal edge of each stud 128 is formed with a complemental bevel as indicated at 134. Similarly, one of the longitudinal edges of each keyway 111 is bevelled as shown at 135 (Figs. 7—9) to cooperate with the bevels 134 on the studs.

The bushing is arranged to grip the stock resiliently by reason of the inward set given the portions separated by the slots 125, 126, and 127. When desired or needed, additional gripping force may be obtained by a spring 130 disposed around the front end of the bushing and held in place by the flange 120.

To assemble the pusher, the bushing is held with the studs 128 aligned with the keyways 115 and the rear end of the bushing, which is smaller in diameter than the main body by reason of the tapered surface 124, is inserted into the collapsed front end of the shell 110. The bushing is then pushed rearwardly, the tapered surface 124 wedging the shell open to receive the bushing, until the studs 128 are positioned in the keyways 115, the parts then occupying the position shown in Fig. 7. The bushing is then turned clockwise, as viewed from the front, and the bevelled edges 134 of the studs 128 cooperating with the bevelled edges 135 of the keyways spreads the shell farther open to permit the studs 128 to pass under the walls of the shell. The turning of the bushing is continued until the studs snap into the L-shaped cutouts 116, as shown in Fig. 8.

In operation the studs normally lie in the portions of the cutouts 116 having the greater axial length by reason of the rotation of the stock, as in the embodiment previously described. On the forward stroke of the pusher tube the wedging surface 117 on the shell moves over the tapered surface 124 of the bushing to increase the grip of the bushing on the stock. On the rearward stroke, the edges 129 of the cutouts engage the studs and slide the bushing over the stock against the relatively light grip provided by the resilience of the bushing. When it is desired to withdraw the bar of stock the studs are turned into the notches 132 to prevent wedging engagement of the surfaces 117 and 124, as in the embodiment previously described.

When it is desired to remove the bushing from the shell, the bushing is turned so that the studs 128 enter the notches 132 and the bevelled edges 134 on the studs engage the bevelled edges 133 of the notches. The bushing is then turned forcibly in a clockwise direction to spread the shell open and permit the studs to pass under the walls of the shell. The bushing is then pulled forwardly and out of the shell.

A further modification of the invention is shown in Figs. 12 to 14 inclusive. In this form the shell 210 is rendered resilient by three slots 211 terminating in holes 212. The shell is formed with three keyways 215 leading in from its front edge and opening into cutouts 216. The shell is provided with a counterbore terminating in a wedging surface 217.

The bushing 218 is formed of three segments 226 separated by slots 227. The forward end of the bushing is provided with a flange 220 which serves to retain a spring 230. The rear end of the bushing is formed with a tapered surface 224 to cooperate with the wedging surface 217 on the shell. Each of the segments 226 is provided with a stud 228, corresponding to the studs 28 and 128 in the modifications previously described, which fits within one of the cutouts 216 in the shell. The assembly, disassembly, and operation of this form of the invention are the same as that of the form shown in Figs. 1 to 4 inclusive.

A further modified embodiment of the invention is shown in Figs. 15 to 19 inclusive. In this form the pusher shell 310 is rendered resilient by slots 311, the shell being given an inward set before hardening, as in the other forms, so that the shell presses upon the bushing.

The shell 311 is formed on its inner surface with threads 340, which are preferably square in cross section. Beyond the threads the inner surface of the shell is tapered to provide a wedging surface 317.

The bushing 318 consists of three segments 326 separated by slots 327 and held together by a spring 330 engaging a flange 320. At its rear end the bushing is formed with a tapered surface 324 for cooperation with the wedging surface 317. In front of the surface 324 the bushing is provided with exterior threads 341 complemental to the threads 340 in the shell.

The bushing 318 is assembled into the shell 318 by inserting the tapered rear end of the bushing into the collapsed shell and spreading the shell until the threads 340 and 341 engage. The bushing is then turned until the threads 341 on the bushing pass completely through the threads 340 on the shell. The bushing is then positioned as shown in Fig. 15 with the tapered surface 324 ready to engage the wedging surface 317 on the advancing stroke of the pusher and with the rear side of the threads 340 ready to engage the front side of the threads 341 to pull the bushing rearwardly on the retracting stroke.

To remove the bushing 318, it is only necessary to turn the bushing in the direction opposite to its normal direction of rotation so as to start the threads 341 into the threads 340, after which the bushing may be screwed out of the shell. In the illustrated embodiment the threads 340 and 341 are left hand to suit a machine in which the pusher tube is not driven except as it is rotated by the stock, and in which the stock is rotated in a counterclockwise direction as viewed from the front end of the spindle.

In the illustrated embodiment, the threads 340 and 341 are cut with a double lead, so that the threads always have at least two bearings on each other at diametrically opposite points when the shell pulls the bushing on its retracting stroke. Fig. 19 is a developed view of the entire surface of the threaded end of the shell, showing the two ends 342 and 343 of the double lead thread disposed 180 degrees apart. It will be understood that the threads may have as many leads as desired.

In operation the wedging surface 317 on the shell engages the tapered surface 324 on the bushing when the shell moves forwardly to increase the grip of the bushing on the stock as in the embodiments previously described. When it is desired to withdraw the bar of stock being worked upon it is only necessary to turn the bushing in the direction opposite to its normal direction of rotation so as to start the threads 341 into the threads 340 after which the bar may be withdrawn rearwardly from the machine without causing engagement of the wedging surface 317 and the tapered surface 324. When a new bar is placed in position the normal rotation of the machine immediately turns the threads 340 and 341 out of engagement and into the normal operative position, as illustrated in Fig. 15.

In Figs. 17 and 18 the surfaces 317 and 324 are shown as knurled or roughened in order to minimize relative rotation between the bushing and the shell. In machines in which the pusher tube is not driven by the spindle the stock normally drives the shell and pusher tube through the friction of the shell on the bushing when the stock is gripped by the collet and being rotated. Roughening the surfaces 317 and 324 reduces the relative slippage and consequent wear between the parts. Manifestly this feature may be applied when desired to any of the various forms of the invention.

Although preferred embodiments of the invention have been described in considerable detail it will be understood that various modifications and re-arrangements of the parts may be resorted to without departing from the scope of the invention as defined in the following claims.

I claim:

1. In a pusher, a collapsible bushing arranged to resiliently grip stock to be fed, a tubular shell having slots extending inwardly from its front edge, the slotted portions of said shell being bent inwardly to a diameter smaller than the outside diameter of said bushing when said bushing is collapsed, said shell surrounding and resiliently gripping said bushing when said bushing is collapsed, said bushing being tapered at its rear end to a size sufficiently small to enter the front end of said shell when the same is collapsed, whereby said bushing may be forced rearwardly into said shell to spread the same, and cooperating abutments on said bushing and shell engageable in normal operative position to hold said bushing against forward movement with respect to said shell.

2. In a pusher, a collapsible bushing arranged to resiliently grip stock to be fed, a tubular shell having slots extending inwardly from its front edge, the slotted portions of said shell being bent inwardly to a diameter smaller than the outside diameter of said bushing when said bushing is collapsed, said shell surrounding and resiliently gripping said bushing when said bushing is collapsed, said bushing being tapered at its rear end to a size sufficiently small to enter the front end of said shell when the same is collapsed, whereby said bushing may be forced rearwardly into said shell to spread the same, a radially projecting lug on said bushing and said shell being formed with an opening through the wall thereof to receive said lug in normal operative position to hold said bushing against forward movement with respect to said shell, said shell being arranged to collapse upon said bushing when no stock is gripped by said bushing so as to maintain said lug in said opening at all times.

3. In a pusher, a collapsible bushing arranged to resiliently grip stock to be fed, a tubular shell having slots extending inwardly from its front edge, said shell surrounding and resiliently gripping said bushing when said bushing is collapsed, said bushing being tapered at its rear end to a size sufficiently small to enter the front end of said shell when the same is collapsed, whereby said bushing may be forced rearwardly into said shell to spread the same, said bushing having a radially projecting member, said shell being formed with an abutment engaging said member in normal operative position to hold said bushing against forward movement with respect to said shell, and a surface on said shell arranged to engage said tapered rear end of said bushing to increase the grip of said bushing on the stock when said bushing moves rearwardly with respect to said shell.

4. In a pusher, a collapsible bushing arranged to resiliently grip stock to be fed, a tubular shell having slots extending inwardly from its front edge, said shell surrounding and resiliently gripping said bushing when said bushing is collapsed, said bushing being tapered at its rear end to a size sufficiently small to enter the front end of said shell when the same is collapsed, whereby said bushing may be forced rearwardly into said shell to spread the same, cooperating abutments on said bushing and shell engageable in normal operative position to hold said bushing against forward movement with respect to said shell, and a surface on said shell arranged to engage the tapered rear end of said bushing to increase the grip of said bushing on the stock when said bushing moves rearwardly with respect to said shell.

5. In a pusher, a collapsible bushing arranged to resiliently grip stock to be fed, a tubular shell having slots extending inwardly from its front edge, said shell surrounding and resiliently gripping said bushing, said bushing being tapered at its rear end to a size sufficiently small to enter the front end of said shell when the same is collapsed, whereby said bushing may be forced rearwardly into said shell to spread the same, said bushing carrying a radially projecting member, said shell being formed with an abutment engaging said member in normal operative position to hold said bushing against forward movement with respect to said shell, a surface on said shell arranged to engage the tapered rear end of said bushing to increase the grip thereof on the stock when said bushing moves rearwardly with respect to said shell, and abutment surfaces on said shell and bushing adapted to be brought into alignment by relative rotation between said shell and bushing to prevent engagement of said surface with the tapered rear end of said bushing.

6. In a pusher, a collapsible bushing arranged to resiliently grip stock to be fed, a tubular shell having slots extending inwardly from its front edge rendering the same resilient, said shell being tensioned inwardly to resiliently grip said bushing, a radially projecting abutment carried by said bushing, said shell being formed with a keyway extending inwardly from its front edge and a communicating cutout spaced from said front edge and offset from said keyway, said keyway being of sufficient width to receive said abutment, whereby said bushing may be forced rearwardly into said shell with said abutment passing through said keyway, and said cutout having a rearwardly facing edge adapted to engage said abutment in normal operative position to hold said bushing against forward movement with respect to said shell and an edge facing laterally toward said keyway to engage said abutment and resist relative rotation of said bushing and said shell in one direction.

7. In a pusher, a collapsible bushing arranged to resiliently grip stock to be fed, a tubular shell having slots extending inwardly from its front edge rendering the same resilient, said shell being tensioned inwardly to resiliently grip said bushing, said bushing being tapered at its rear end to a size sufficiently small to enter the front end of said shell when the same is collapsed, a radially projecting abutment carried by said bushing, said shell being formed with a keyway extending inwardly from its front edge and a communicating cutout spaced from said front edge and offset from said keyway, said keyway being of sufficient width to receive said abutment, whereby said bushing may be forced rearwardly into said shell with said abutment passing through said keyway, and said cutout having a rearwardly facing edge adapted to engage said abutment in normal operative position to hold said bushing against forward movement with respect to said shell and an edge facing laterally toward said keyway to engage said abutment and resist relative rotation of said bushing and said shell in one direction.

8. In a pusher, a collapsible bushing arranged to resiliently grip stock to be fed, a tubular shell having slots extending inwardly from its front edge rendering the same resilient, said shell being tensioned inwardly to resiliently grip said bushing, a radially projecting abutment carried by said bushing, said shell being formed with a keyway extending inwardly from its front edge and a communicating cutout spaced from said front edge and offset from said keyway, said keyway being of sufficient width to receive said abutment, whereby said bushing may be forced rearwardly into said shell with said abutment passing through said keyway, and said cutout having a rearwardly facing edge adapted to engage said abutment in normal operative position to hold said bushing against forward movement with respect to said shell and an edge facing laterally toward said keyway to engage said abutment and resist relative rotation of said bushing and said shell in one direction, and cooperating wedging surfaces on said shell and said bushing to increase the grip of said bushing on the stock when said bushing moves rearwardly with respect to said shell.

9. In a pusher, a collapsible bushing arranged to resiliently grip stock to be fed, a tubular shell having slots extending inwardly from its front edge rendering the same resilient, said shell being tensioned inwardly to resiliently grip said bushing, the rear end of said bushing being tapered to a size sufficiently small to enter the front end of said shell when the same is collapsed, radially projecting abutments carried by said bushing, said shell being formed with keyways extending inwardly from its front edge and with a cutout communicating with each of said keyways spaced from the front edge and offset from said keyways in the direction of normal rotation of the stock, said keyways being of sufficient width to receive said abutments, whereby said bushing may be forced rearwardly into said shell with said abutments passing through said keyways and may be turned in the direction of normal rotation to bring said abutments into said cutouts, and said cutouts having rearwardly facing edges adapted to engage said abutments in normal operative position to hold said bushing against forward movement with respect to said shell and edges facing laterally toward said keyways adapted to engage said abutments and resist relative rotation of said bushing and said shell in one direction.

10. In a pusher, a collapsible bushing arranged to resiliently grip stock to be fed, a tubular shell having slots extending inwardly from its front edge rendering the same resilient, said shell being tensioned inwardly to resiliently grip said bushing, a radially projecting stud carried by said bushing having one side edge bevelled, said shell being formed with a keyway extending into the same from its front edge and a recess spaced from the front edge and from said keyway, whereby said bushing may be pushed into said shell with said stud passing through said keyway and may be turned to force the beveled edge of said stud against an edge of said keyway to expand said shell and permit said stud to be positioned in said recess.

11. In a pusher, a collapsible bushing arranged to resiliently grip stock to be fed, a tubular shell having slots extending inwardly from its front edge rendering the same resilient, said shell being tensioned inwardly to resiliently grip said bushing, said bushing being tapered at its rear end to a size sufficiently small to enter the front end of said shell when the same is collapsed, a radially projecting stud carried by said bushing having one side edge bevelled, said shell being formed with a keyway extending into the same from its front edge and a recess spaced from the front edge and from said keyway, whereby said bushing may be pushed into said shell to expand the same with said stud passing through said keyway and may be turned to force the bevelled edge of said stud against an edge of said keyway to further expand said shell and permit said stud to be positioned in said recess.

12. In a pusher, a collapsible bushing arranged to resiliently grip stock to be fed, a tubular shell having slots extending inwardly from its front edge rendering the same resilient, said shell being tensioned inwardly to resiliently grip said bushing, a radially projecting stud carried by said bushing having one side edge bevelled, said shell being formed with a keyway extending into the same from its front edge and a recess spaced from the front edge and from said keyway, whereby said bushing may be pushed into said shell with said stud passing through said keyway and may be turned to force the beveled edge of said stud against an edge of said keyway to expand said shell and permit said stud to be positioned in said recess in normal operative position, said recess having one side edge arranged to cooperate with the bevelled side of said stud whereby rotation of said bushing from its normal operative position expands said shell and forces said stud under said shell to permit removal of said bushing.

13. In a pusher, a collapsible bushing arranged to resiliently grip stock to be fed, a tubular shell having slots extending inwardly from its front edge rendering the same resilient, said shell being tensioned inwardly to resiliently grip said bushing, the rear end of said bushing being tapered to a size sufficiently small to enter the front end of said shell when the same is collapsed, a radially projecting stud carried by said bushing having one side edge bevelled, said shell being formed with a keyway extending into the same from its front edge and a recess spaced from the front edge and from said keyway, whereby said bushing may be pushed into said shell with said stud passing through said keyway and may be turned to force the bevelled edge of said stud against an edge of said keyway to expand said shell and permit said stud to be positioned in said recess in normal operative position, said recess having an edge arranged to engage said stud to prevent forward movement of said bushing with respect to said shell, and said shell having a wedging surface arranged to engage the tapered rear end of said bushing to increase the grip thereof on the stock when said bushing moves rearwardly with respect to said shell.

14. In a pusher, a collapsible bushing arranged to resiliently grip stock to be fed, a tubular shell surrounding said bushing and having slots extending inwardly from its front edge rendering the same resilient, said shell being tensioned inwardly to resiliently grip said bushing when said bushing is collapsed, the inner surface of said shell being formed with screw threads, and cooperating screw threads on the outer surface of a portion of said bushing positioned rearwardly of the threads on said shell in the normal operative position of the bushing, said threads being engageable to permit installation or removal of said bushing through the front end of said shell by screwing the threads on the bushing through the threads on the shell.

15. In a pusher, a collapsible bushing arranged to resiliently grip stock to be fed, a tubular shell surrounding said bushing and having slots extending inwardly from its front edge rendering the same resilient, said shell being tensioned inwardly to resiliently grip said bushing, the rear end of said bushing being tapered to a size sufficiently small to enter the front end of said shell when the same is collapsed, the inner surface of said shell being formed with screw threads, and cooperating screw threads formed on said bushing in front of the tapered rear end thereof and positioned rearwardly of the threads on said shell in the normal operative position of said bushing.

16. In a pusher, a collapsible bushing arranged to resiliently grip stock to be fed, a tubular shell surrounding said bushing and having slots extending inwardly from its front edge rendering the same resilient, said shell being tensioned inwardly to resiliently grip said bushing, the inner surface of said shell being formed with screw threads, and cooperating screw threads on said bushing positioned rearwardly of the threads on said shell in the normal operative position of said bushing, the front ends of the threads on said bushing being adapted to engage the rear ends of the threads on said shell to prevent forward movement of said bushing with respect to said shell, and cooperating wedging surfaces arranged to engage to increase the grip of the bushing on the stock when said bushing moves rearwardly with respect to said shell.

17. In a pusher, a collapsible bushing arranged to resiliently grip stock to be fed, a tubular shell surrounding said bushing and having slots extending inwardly from its front edge rendering the same resilient, said shell being tensioned inwardly to resiliently grip said bushing, the rear end of said bushing being tapered to a size sufficiently small to enter the front end of said shell when the same is collapsed, the inner surface of said shell being formed with screw threads, cooperating screw threads on said bushing positioned rearwardly of the threads on said shell in the normal operative position of said bushing and adapted to engage the rear ends of the threads in said shell to prevent forward movement of said bushing with respect to said shell, and a wedging surface on said shell arranged to engage the tapered rear end of said bushing to increase the grip thereof on the stock when said bushing moves rearwardly with respect to said shell.

18. In a pusher, a collapsible bushing arranged to resiliently grip stock to be fed, a tubular shell having slots extending inwardly from its front edge, said shell surrounding and resiliently gripping said bushing when said bushing is collapsed, said bushing being tapered at its rear end to a size sufficiently small to enter the front end of said shell when the same is collapsed, whereby said bushing may be forced rearwardly into said shell to spread the same, said bushing having a radially projecting member, said shell being formed with an opening receiving said member in normal operative position to hold said bushing against forward movement with respect to said shell, a surface on said shell arranged to engage said tapered rear end of said bushing to increase the grip of said bushing on the stock when said bushing moves rearwardly with respect to said shell, and said bushing being formed with a portion projecting from the front end of the shell having a surface tapering to a diameter larger than the inside diameter of the shell arranged to engage the front end of the shell to increase the grip of the bushing on the stock when said bushing moves rearwardly with respect to said shell.

STODDARD B. MARTIN.